(12) United States Patent
Oestreich et al.

(10) Patent No.: US 6,467,496 B2
(45) Date of Patent: Oct. 22, 2002

(54) SINGLE-ADJUSTMENT, DUAL-NULL PRESSURE SETTING FOR AN ELECTROHYDRAULIC VALVE PILOT STAGE

(75) Inventors: Kenneth L. Oestreich, Fridley; Wayne R. Anderson, Eden Prairie, both of MN (US)

(73) Assignee: Sauer-Danfoss Inc., Ames, IA (US)

(*) Notice: Subject to any disclaimer, the term of this patent is extended or adjusted under 35 U.S.C. 154(b) by 0 days.

(21) Appl. No.: 09/862,060

(22) Filed: May 21, 2001

(65) Prior Publication Data

US 2002/0066481 A1 Jun. 6, 2002

Related U.S. Application Data

(63) Continuation-in-part of application No. 09/728,964, filed on Dec. 4, 2000.

(51) Int. Cl.$^7$ .............................................. G05D 16/20
(52) U.S. Cl. ................ 137/82; 137/596.15; 137/596.16
(58) Field of Search .......................... 137/82, 596.15, 137/596.16

(56) References Cited

U.S. PATENT DOCUMENTS

| | | | |
|---|---|---|---|
| 2,882,437 A | * | 4/1959 | McKechnie ............... 137/82 X |
| 2,911,991 A | | 11/1959 | Pearl |
| 3,015,343 A | * | 1/1962 | Gardiner et al. ........ 137/625.61 |
| 3,176,593 A | * | 4/1965 | Bernstein ........... 137/625.61 X |
| 3,183,918 A | | 5/1965 | Bester |
| 3,364,822 A | * | 1/1968 | Gutkowski ......... 137/596.15 X |
| 4,362,182 A | | 12/1982 | Sjolund |
| 4,537,220 A | | 8/1985 | Anderson |
| 4,576,200 A | | 3/1986 | Janecke et al. |
| 4,621,660 A | | 11/1986 | Klocke |
| 4,715,397 A | | 12/1987 | Stearns |
| 4,719,942 A | * | 1/1988 | Hayner ..................... 137/82 X |
| 4,783,047 A | | 11/1988 | Baltus et al. |
| 4,794,941 A | | 1/1989 | Godon |
| 5,590,677 A | * | 1/1997 | Kuroda ....................... 137/85 |
| 5,653,422 A | | 8/1997 | Pieloth et al. |
| 5,875,630 A | | 3/1999 | Walsh et al. |

* cited by examiner

Primary Examiner—Gerald A. Michalsky

(57) ABSTRACT

An electrohydraulic valve pilot stage for controlling differential pressure is disclosed. The electrohydraulic valve pilot stage has a housing for protecting the valve; a first and second inlet capable of connection to fluid supplies; a first nozzle and a second nozzle fluidly connected to the inlets; a baseplate attached to the housing and the nozzles; a restraining member attached to the baseplate at a position between the first nozzle and the second nozzle; a pivot pin; a flapper restrained by the restraining member and having a first end and a second end, the flapper pivotably mounted on the pivot pin; and a null adjust pin mounted in a pivot pin contact capable position for adjusting the position of the ends of the flapper relative to the nozzles.

5 Claims, 7 Drawing Sheets

SINGLE-ADJUSTMENT, DUAL-NULL PRESSURE SETTING FOR AN ELECTROHYDRAULIC VALVE PILOT STAGE

This is a continuation-in-part of co-pending U.S. application Ser. No. 09/728,964, filed Dec. 4, 2000, which is incorporated by reference herein in its entirety.

FIELD OF THE INVENTION

The invention relates to an apparatus for providing single adjustment dual-null pressure setting of nozzle pressures in a pilot stage.

BACKGROUND OF THE INVENTION

Existing nozzle-flapper and other types of hydraulic valves require individual precision settings of each nozzle during assembly of the hydraulic device. During the assembly process, each part is precisely positioned. This need for precision is due to the typically small spacing between a nozzle and flapper. For example, the spacing may be between 0.002 and 0.004 inches. The spacing is important in the hydraulic valves as the spacing must be precise in order to balance pressures. Existing processes require either precision parts or precision assembly processes, or both. Despite the use of precision parts and precision assembly which are both costly and time consuming, the setting may not be precise in the differential pressure nozzles and a null offset will result. These differences or null offsets are undesirable, as they hinder the ability of the hydraulic valve to properly operate with differential pressures.

This problem of null offsets makes manufacturing of nozzle flapper hydraulic valves time consuming and costly.

It is therefore a primary objective of the present invention to provide an adjustable pressure setting for a pressure control pilot valve.

It is a further objective of the present invention to provide a pressure setting that permits multiple pressure levels to be adjusted with a single adjustment in such a valve.

It is a further objective of the present invention to improve the manufacturing process of nozzle-flapper hydraulic valves.

It is a still further objective of the present invention to provide a null adjustment that reduces manufacturing cost and/or time for nozzle-flapper hydraulic valves.

These and other objectives of the present invention will become apparent from this specification and claims.

SUMMARY OF THE INVENTION

The invention is a single adjustment dual-null pressure setting for hydraulic valves. The invention provides for an adjustment at the pivot of a flapper allowing multiple nozzles in the same plane to be adjusted through a single adjustment in order to reduce differential null pressures.

The invention makes a single adjustment at the location of the pivot of a flapper. The adjustment may be made by a pin such as a finely threaded screw or a press fit shaft. The null adjustment pin contacts a pivot pin. By adjusting the null adjustment pin, the location of the pivot pin is adjusted. The adjustment of the pivot pin causes the position of the flapper relative to each nozzle to change. In this manner, the adjustment can be made until a point is reached where each individual null pressure is established without a differential pressure.

BRIEF DESCRIPTIONS OF THE DRAWINGS

DETAILED DESCRIPTION OF EXEMPLARY EMBODIMENTS

Figure 1:
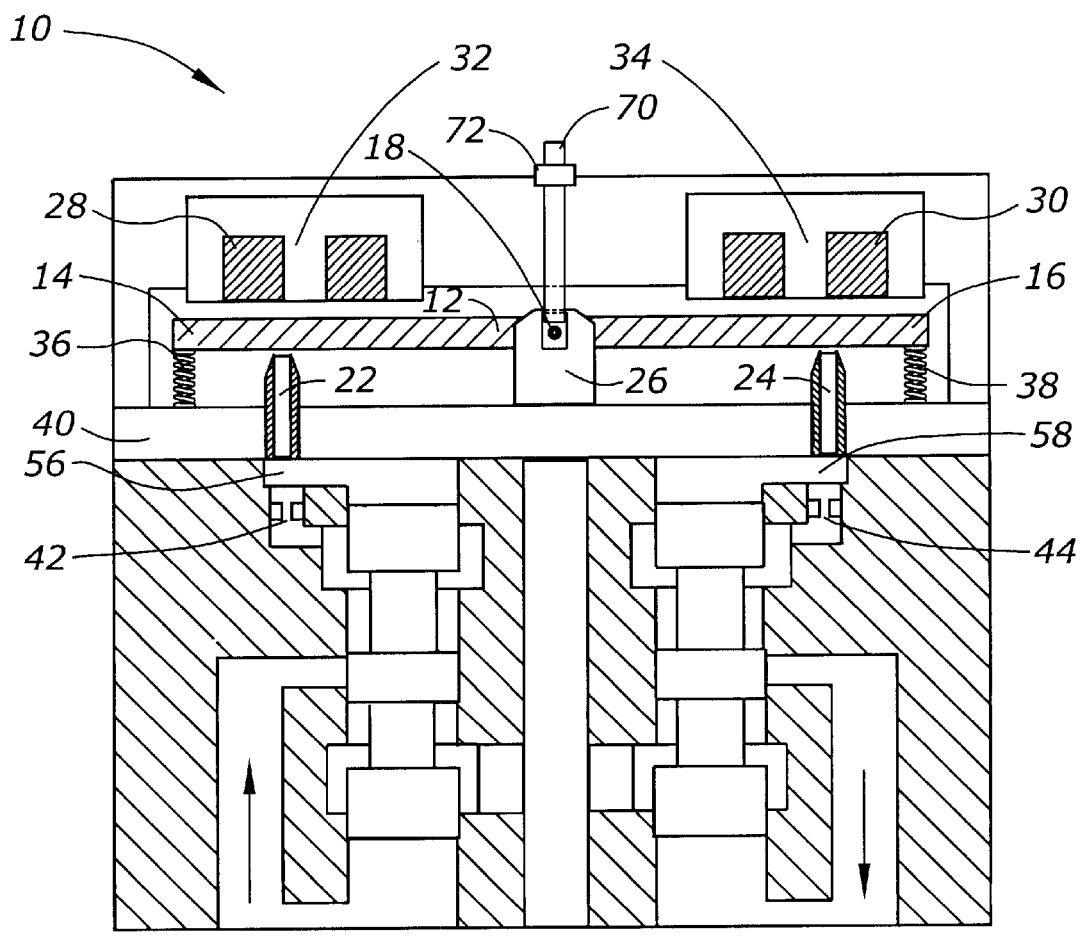
FIG. 1 is a front view of a pilot stage showing a single adjustment dual-null pressure setting.

FIG. 1 illustrates a pilot stage 10 using a single adjustment dual-null pressure setting. The pilot stage is an eletrohydraulic pilot stage. In the pilot stage 10 the armature is the flapper 12. The flapper 12 has a first end 14 and a second end 16. The flapper 12 is mounted on a pivot pin 18. Below each end of the flapper 12 is a nozzle. Nozzle 22 is beneath end 14 and nozzle 24 is beneath end 16. The vertically disposed nozzles both have fluid outlet ports at their upper ends. Support member 26 provides additional support for the flapper 12, and provides only pivoted and vertical movement of pin 18 and flapper 12 with respect thereto (FIG. 1). Above the flapper 12 is the magnetic coil 287 above flapper end 14 and the magnetic coil 30 above the opposite flapper end 16. The magnetic coil 28 is wrapped around a center shaft of the magnetic pole piece 32. The magnetic coil 30 is wrapped around a center shaft of a center shaft of magnetic pole piece 34.

When an input current is supplied to the magnetic coil 28, the flapper 12 will pivot. The pivotal movement of the flapper 12 moves one end of the flapper 12 closer to one of the nozzles, creating a differential pressure between the nozzles. When a second magnetic coil 30 is also used, the flapper can be pivoted in two directions. The differential pressure in both directions is proportional to the input current. The pressure differential acts on the flapper 12 counteracting the torque provided by the magnetic torque motor (not numbered).

Beneath the flapper 12 are trim springs 36 and 38. Trim spring 36 is beneath end 14 of flapper 12 and trim spring 38 is beneath end 16 of flapper 12. The optional trim springs shown may be mounted on base plate 40. Base plate 40 contains nozzles 22 and nozzles 24. The nozzles may be formed on the plate.

Nozzle 22 has power orifice 42. Nozzle 24 has power orifice 44. The nozzles 22 and 24 have fluid outlet ports in their upper ends. Pressure is supplied to each nozzle from a pressure supply through each power orifice. Power orifice 42 supplies pressure to nozzle 22 and power orifice 44 supplies pressure to nozzle 24. Together, output control port 56 and output port 58 provide the output differential pressure from the pilot stage 10 to the boost stage. The present invention contemplates that any number of boost stages may be used with the pilot stage of the present stage and is no way limited to the particular boost stage shown.

The distance between each flapper end and nozzle affects the differential pressure. These distance can be adjusted through use of a null adjustment pin such as screw 70 in order to stablish individual null pressure levels at each nozzle. Screw 70 contacts with pivot pin 18. Preferably screw 70 is finely threaded so as to permit fine adjustment. Adjustment of screw 70 causes adjustment of the position of pin 18. As the position of pin 18 is adjusted, the spacing between flapper end 14 and nozzle 22 and the spacing between flapper lend 16 and nozzle 24 is adjusted. Thus a single adjustment of adjustment screw 70 permits adjustment of both the spacing between nozzle 22 in the flapper and the spacing between nozzle 24 in the flapper. The present invention also contemplates that screw 70 may also be secured to a housing with a locking nut 72 or other means such as may be suggested by a particular use or environment. The present invention also contemplates that instead of an adjustment screw, other mechanisms could be used such as other pins, a bolt, a shaft, on by press fit.

Figure 2:
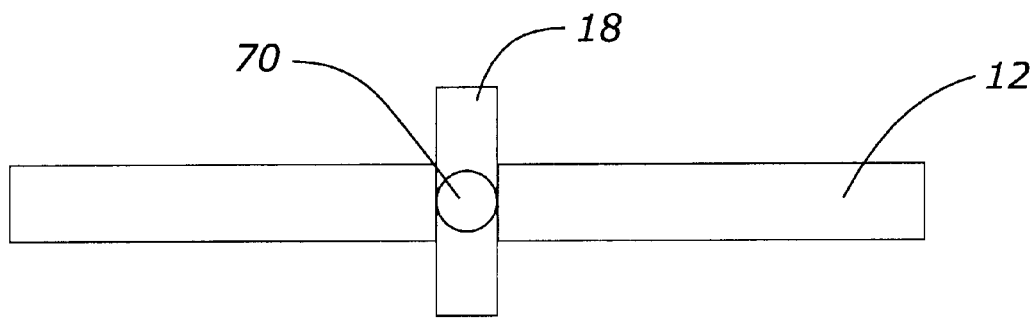
FIG. 2 is a top plan view of a single adjustment null pressure setting.
Figure 3:
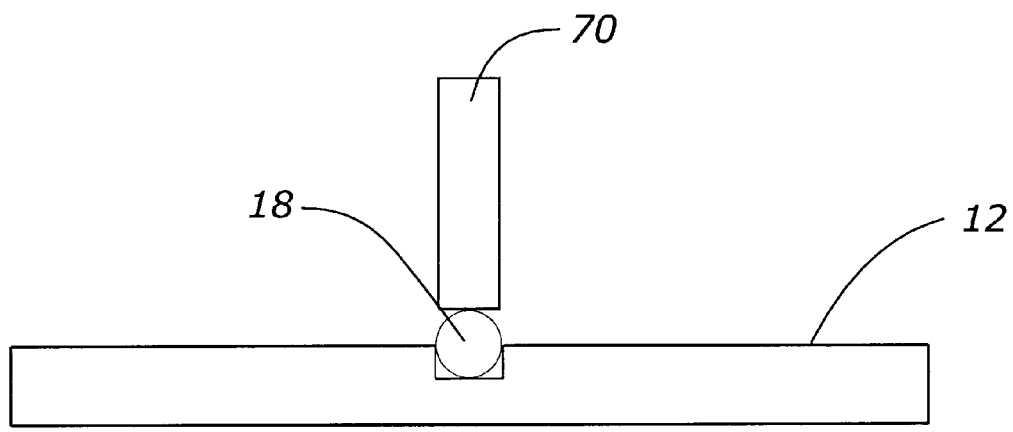
FIG. 3 is a side view of FIG. 2.

FIG. 2 shows a top view of the adjustment using the screw 70 of FIG. 1. In FIG. 2 the screw 70 adjusts the position of pivot pin 18 thus adjusting flapper 12. This is similarly shown in the front view of FIG. 3. The finely threaded screw 70 adjusting the position of pin 18 and thus the position of flapper 12. The present invention also contemplates that multiple adjustment pins may be used. For example a first adjustment pin may be used as a guide and a second adjustment pin may be used for fine adjustment.

Figure 4:
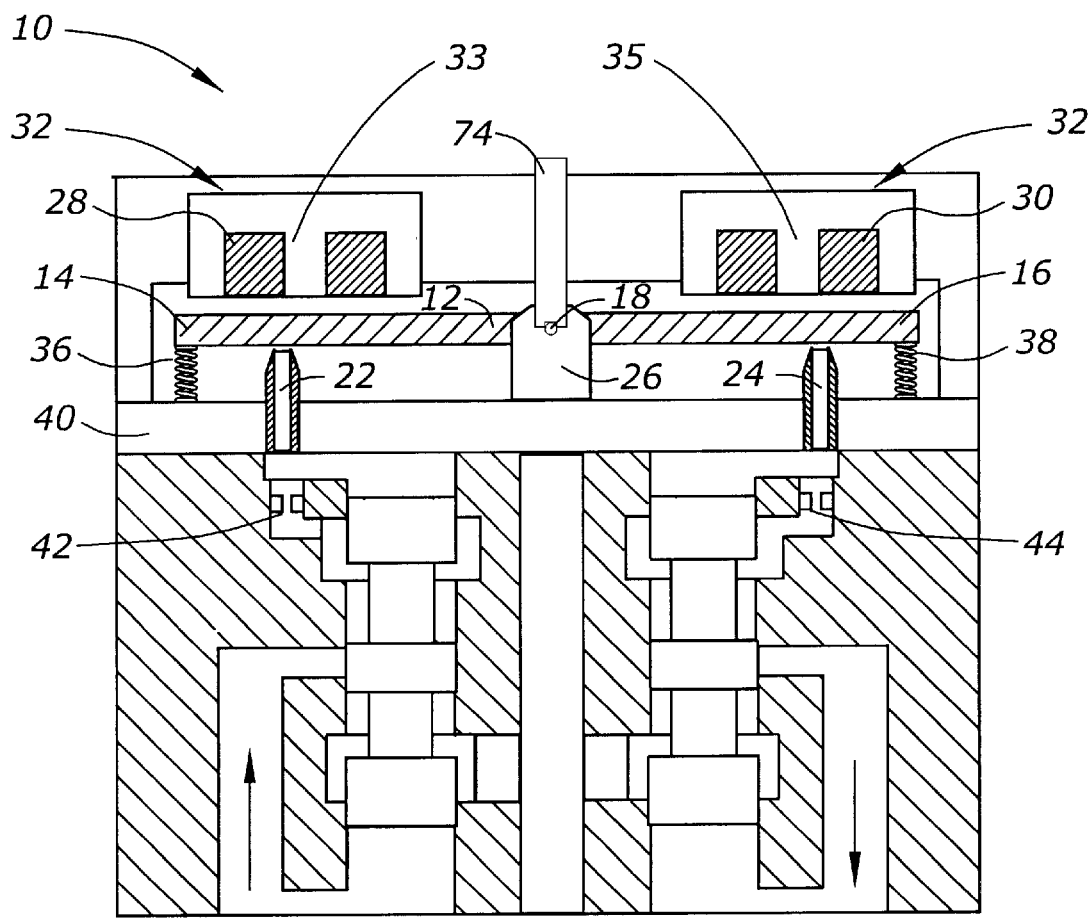
FIG. 4 is a front view of a single adjustment dual null pressure setting.
Figure 5:
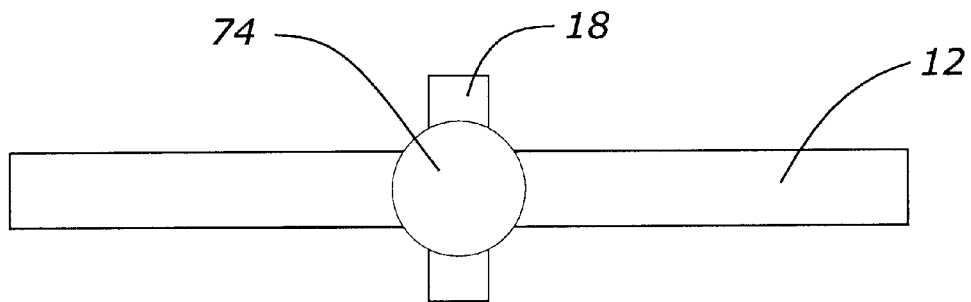
FIG. 5 is a top plan view of FIG. 4.
Figure 6:
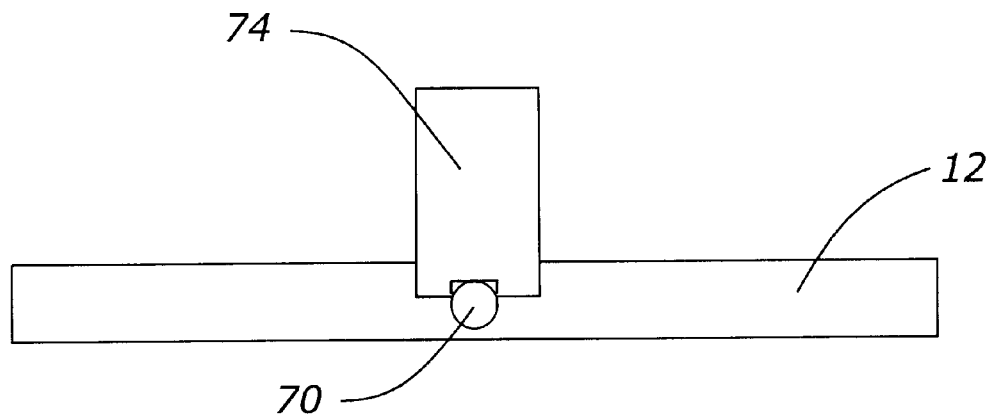
FIG. 6 is a side view of FIGS. 4 and 5.
Figure 7:
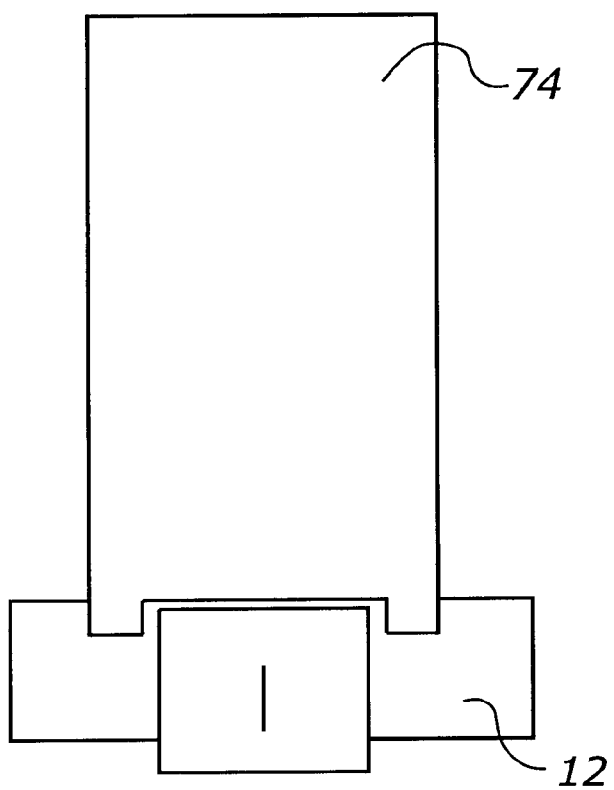
FIG. 7 is an end view of a single adjustment null pressure setting of the structure of FIG. 6.

In FIG. 4, the adjustment pin straddles the pivot pin. This provides for the use of an adjustment pin where the armature does not have direct access to the pin. The adjustment may be press fit as shown or may be a finely threaded screw.

A single adjustment dual-null pressure setting has been disclosed. One skilled in the art will appreciate that a pin, screw, shaft, or other variation may be used, multiple pins may be used, the setting may be adjustable or press fit, other orientations of the setting may be used and other variations are contemplated by the present invention.

What is claimed is:

1. An electrohydraulic valve for controlling differential hydraulic fluid pressure, comprising, a housing, a first inlet capable of connection to a first pressurized fluid supply, a second inlet capable of connection to a second pressurized fluid supply, a horizontal baseplate mounted within the housing, first and second spaced upstanding vertical nozzles having fluid outlet ports at upper ends thereof mounted on the baseplate and being fluidly connected to the first and second nozzles, respectively, a support member on the baseplate midway between the first and second nozzles, an elongated transversely extending pivot pin rotatably mounted with respect to the support member and adapted for vertical movement therewith, an elongated magnetic flapper member pivotally mounted with respect to the pivot pin in a normally horizontal position and extending over the fluid outlet ports of the nozzles in spaced relation thereto, and being adapted to pivot in a vertical plane, resilient restraining means in the housing connected to the flapper member for normally holding the flapper member in a horizontal position, a vertically disposed adjust pin mounted in the housing for vertical movement and having a lower end in contact with the pivot pin for adjusting the space between the flapper member and the fluid outlet ports of the nozzles, and magnetic means in the housing for selectively pivoting the flapper member to effect a distance variation between the flapper member and the outlet ports of the nozzles to create a differential fluid pressure therebetween.

2. The electrohydraulic valve of claim, 1 wherein the adjust pin is a finely threaded screw.

3. The electrohydraulic valve of claim 1 wherein the null adjust pin straddles the flapper member.

4. The electrohydraulic valve of claim 1 wherein the center of the adjust pin and the center of the pivot pin contact.

5. The electrohydraulic valve of claim 1 further comprising a locking nut mounted on an upper end of the pin.

* * * * *